Patented June 13, 1950

2,511,011

UNITED STATES PATENT OFFICE 2,511,011

METHOD FOR PRODUCING PSEUDODIOSGENIN

George Rosenkranz and Stephen Kaufmann, Mexico City, Mexico, assignors to Syntex, S. A., Mexico City, Mexico, a corporation of Mexico No Drawing. Application March 24, 1948, Serial No. 16,885. In Mexico December 4, 1947

4 Claims. (Cl. 260—239.5)

The present invention relates to a process for preparing hormone intermediates. More particularly the present invention relates to a process for converting pseudokryptogenin and/or esters of pseudokryptogenin into pseudodiosgenin and/or esters of pseudodiosgenin.

Pseudodiosgenin is a valuable intermediate for the production of hormones by methods well known in the art. In our copending application, Serial No. 16,884 filed March 24, 1948, there is disclosed a method of producing pseudodiosgenin esters by the treatment of esters of 16-dihydrokryptogenin with dehydrating agents. The present invention relates to another method of producing pseudodiosgenin and esters thereof. Marker, Wagner, Ulshafer, Wittbecker, Goldsmith and Ruof (Journal of American Chemical Society, 69, No. 9, page 2,200, 1947) disclosed the formation of pseudokryptogenin from kryptogenin and the following formula was suggested:

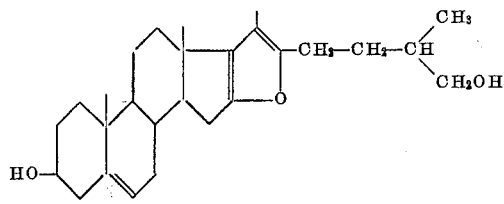

It was also pointed out in the aforementioned article that catalytic reduction of pseudokryptogenin in a hydrogen atmosphere, in acid medium and in the presence of Adams catalyst, produces dihydropseudotigogenin.

In accordance with the present invention it has been discovered that when pseudokryptogenin and/or its esters are partially hydrogenated in a neutral or slightly alkaline medium in the presence of a selective catalyst, a partial hydrogenation occurred at the 16, 17 double bond without affecting other double bonds in the molecule.

The selective catalyst is preferably selected from the group consisting of finely divided nickel (Raney nickel), finely divided palladium and finely divided palladium on a suitable carrier. In practising the invention the pseudokryptogenin and/or ester thereof is preferably dissolved in a suitable solvent such as a lower alcohol or a lower alcohol ester. The catalyst is then added and the mixture agitated in a hydrogen atmosphere until the pseudodiosgenin or ester thereof is produced.

The process as above outlined produces pseudodiosgenin or the esters of pseudodiosgenin.

The aforementioned reaction can be illustrated by the following equation:

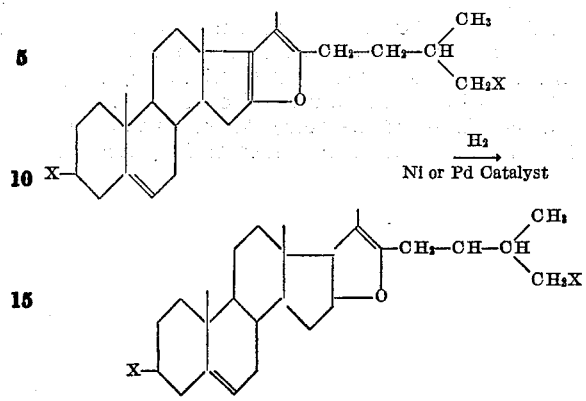

wherein "X" equals OH or O-acyl. The acyl group may be substantially any aliphatic saturated or aromatic saturated radical. For example, if the acyl group is an aliphatic saturated radical it may be the residue of any suitable fatty acid and preferably a lower fatty acid, such as acetic. In the alternative, the residue of an aromatic saturated acid may be utilized as, for example, benzoic.

The following examples serve to illustrate the present invention but are not intended to limit the same.

Example I 10 grams of pseudokryptogenin were dissolved in 500 cc. of alcohol and 5 grams of Raney nickel were added. The mixture was agitated in a hydrogen atmosphere for two hours. Then the nickel was filtered off and the alcoholic solution concentrated to a volume of approximately 100 cc. On cooling pseudodiosgenin, melting point 195°–197° crystallized.

Example II 10 grams of pseudokryptogenin diacetate were dissolved in 200 cc. of alcohol and 5 grams of Raney nickel were added. The mixture was agitated in a hydrogen atmosphere for two hours. The nickel was filtered off and the alcoholic solution then evaporated to dryness. The residue was crystallized from methanol and pseudodiosgenin diacetate, melting point 98°–100°, was obtained.

Example III 10 grams of pseudokryptogenin were dissolved in 500 cc. of ethyl acetate and 5 grams of a catalyst consisting of barium sulphate and 5% palladium finely divided, was added. The mixture was agitated in a hydrogen atmosphere for two hours. The catalyst was filtered off and the filtrate evaporated to dryness. The residue was crystallized from alcohol and pseudodiosgenin, melting point 195°–197°, was obtained.

*Example IV*

10 grams of pseudodkryptogenin diacetate were dissolved in 200 cc. of ethyl acetate and the process was carried out using the catalyst and conditions of Example III. The hydrogenation product was crystallized from methanol and pseudodiosgenin diacetate, melting point 98°–100°, was obtained.

It will be obvious to those skilled in the art that various changes may be made without departing from the spirit of the invention and therefore the invention is not limited to what is described in the specification but only as indicated in the appended claims.

What is claimed is:

1. A process for the preparation of compounds selected from the group consisting of pseudodiosgenin and esters of pseudodiosgenin, comprising hydrogenating compounds selected from the group consisting of pseudokryptogenin and esters of pseudokryptogenin in a substantially neutral medium and in the presence of a catalyst selected from the group consisting of finely divided nickel, finely divided palladium and finely divided palladium on a suitable carrier therefor.

2. A process for the production of pseudodiosgenin comprising hydrogenating pseudokryptogenin in a substantially neutral medium and in the presence of a catalyst selected from the group consisting of finely divided nickel, finely divided palladium and finely divided palladium on a suitable carrier therefor.

3. A process for the preparation of pseudodiosgenin esters comprising hydrogenating pseudokryptogenin esters in a substantially neutral medium and in the presence of a catalyst selected from the group consisting of finely divided nickel, finely divided palladium and finely divided palladium on a suitable carrier therefor.

4. A process for the prouction of pseudodiosgenin diacetate comprising hydrogenating pseudokryptogenin diacetate in a substantially neutral medium and in the presence of a catalyst selected from the group consisting of finely divided nickel, finely divided palladium and finely divided palladium on a suitable carrier therefor.

GEORGE ROSENKRANZ.
STEPHEN KAUFMANN.

No references cited.